(12) United States Patent
Gassaway

(10) Patent No.: US 9,091,359 B1
(45) Date of Patent: Jul. 28, 2015

(54) PUMP CHECK-VALVE RUBBER FLAPPER LIFE EXTENDER SYSTEMS

(71) Applicant: Steve Gassaway, Santa Fe, TX (US)

(72) Inventor: Steve Gassaway, Santa Fe, TX (US)

( * ) Notice: Subject to any disclaimer, the term of this patent is extended or adjusted under 35 U.S.C. 154(b) by 0 days.

(21) Appl. No.: 14/029,767

(22) Filed: Sep. 17, 2013

Related U.S. Application Data

(60) Provisional application No. 61/707,560, filed on Sep. 28, 2012.

(51) Int. Cl.
  *F16K 15/16* (2006.01)
  *F16K 15/14* (2006.01)
(52) U.S. Cl.
  CPC .................................... *F16K 15/144* (2013.01)
(58) Field of Classification Search
  CPC .... F16K 15/144; F16K 15/16; F04B 39/1073
  USPC ...................... 137/855–858, 565.13; 251/358; 417/566, 571
  See application file for complete search history.

(56) References Cited

U.S. PATENT DOCUMENTS

| | | | | |
|---|---|---|---|---|
| 4,356 A | * | 1/1846 | Pollard | 441/40 |
| 217,201 A | * | 7/1879 | Crawley | 137/858 |
| 441,339 A | * | 11/1890 | Swann | 137/858 |
| 2,386,485 A | * | 10/1945 | Longenecker | 415/116 |
| 2,767,735 A | | 10/1956 | Darling | |
| 3,295,547 A | | 1/1967 | Scaramucci | |
| 3,347,265 A | | 10/1967 | Groh | |
| 3,805,828 A | | 4/1974 | Panagrossi | |
| 4,304,265 A | * | 12/1981 | Sell | 137/856 |
| 4,643,139 A | * | 2/1987 | Hargreaves | 123/65 V |
| 5,285,816 A | | 2/1994 | Herlihy | |
| 5,355,910 A | | 10/1994 | Gies | |
| 6,679,688 B2 | * | 1/2004 | Sato et al. | 417/559 |
| 7,503,843 B1 | * | 3/2009 | Wilmoth | 454/162 |

* cited by examiner

*Primary Examiner* — Jessica Cahill
(74) *Attorney, Agent, or Firm* — RG Patent Consulting, LLC; Rachel Gilboy

(57) ABSTRACT

The flapper reinforcement plate is a metal C-shaped stiffening plate for attachment to rubber flapper style centrifugal pump check valves. The C-shaped plate assists in sealing by adding weight to the rubber flapper and preventing torsional flexing of the rubber flapper. The improved sealing lengthens the service life of the check valve.

1 Claim, 5 Drawing Sheets

US 9,091,359 B1

PUMP CHECK-VALVE RUBBER FLAPPER LIFE EXTENDER SYSTEMS

CROSS-REFERENCE TO RELATED APPLICATION

The present application is related to and claims priority from prior provisional application Ser. No. 61/707,560, filed Sep. 28, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of check valves and more specifically relates to a pump check-valve rubber flapper life extender system.

DESCRIPTION OF THE RELATED ART

Pumps are used in nearly every facet of modern society where liquids are transferred from one location to another. Pumps are used in appliances, automobiles, water treatment plants, boats, and industrial plants just to name a few. There are at least nine categories of pump types. Each type of pump may be used in conjunction with a check valve depending on the application it is used in. Many check valves may be installed inline within a pipeline or may be designed into the pump. Many portable pumps having flexible suction hoses and discharge lines have replaceable flexible rubber flappers inside that act as a check valve to maintain pump prime in the event that the pump shuts down.

Flexible rubber check valves are low cost and work well in many centrifugal pumps. While the rubber flapper type check valve is low cost, it has drawbacks. These flappers have to be replaced frequently due to wear or twisting of the rubber as it gradually hardens with use. The flappers also are suspended by a tab which tends to torsionally flex at times and allow the flapper to seat off-center which causes pressurized water to back-feed across the sealing face destroying it. An innovation that would increase check valve reliability and service life span is desirable.

Various attempts have been made to solve the above-mentioned problems such as those found in U.S. Pat. No. 5,285,816 to Geoffrey F. Herlihy; U.S. Pat. No. 3,805,828 to A Us Panagrossi; U.S. Pat. No. 3,295,547 to Scaramucci Domer; U.S. Pat. No. 5,355,910 to Mark C. Gies; U.S. Pat. No. 3,347,265 to Groh Richard E.; and U.S. Pat. No. 2,767,735 to Darling William H. This art is representative of check valves. None of the above inventions and patents, taken either singly or in combination, is seen to describe the invention as claimed.

Ideally, a flapper style rubber check valve should provide positive sealing and long life, and yet would operate reliably and be manufactured at a modest expense. Thus, a need exists for a reliable pump check-valve rubber flapper life extender system to avoid the above-mentioned problems.

BRIEF SUMMARY OF THE INVENTION

In view of the foregoing disadvantages inherent in the known check valve art, the present invention provides a novel pump check-valve rubber flapper life extender system. The general purpose of the present invention, which will be described subsequently in greater detail is to provide improved sealing and longevity.

The pump check-valve rubber flapper life extender system may comprise a flapper reinforcement plate having a mount tab with at least one mounting through-hole (preferably 2 in preferred embodiments), a semi-circular C-plate having a top end, a bottom end, a first contact face, and an outside face. The pump check-valve rubber flapper life extender system comprises the flapper reinforcement plate having a mount tab preferably attached to a semi-circular C-plate. The mount tab may comprise a rectangular shape and at least 2 mounting through-holes and is able to be fastened to the check-valve rubber flapper via fasteners, thus minimizing side-to-side movement relative to an inlet of the centrifugal pump.

The through-hole(s) are adjacent to the top-edge of the mount tab and are located a small distance apart linearly to each other. Parameters of the semi-circular C-plate are defined by the top end, the bottom end, the first contact face, and the outside face. The semi-circular C-plate is C-shaped or may resemble a fork shape, but in alternate embodiments may comprise other shapes. The mount tab of the flapper reinforcement plate is coplanar and integral with the top end of the semi-circular C-plate. The mounting through-holes are located in the mount tab. Positionally speaking, the bottom end is located at the opposing end of the flapper reinforcement plate from the mount tab. The first contact face of the semi-circular C-plate is parallel planar with the outside face and the first contact face and the outside face are integral with the semi-circular C-plate. The C-shape of the semi-circular C-plate is able to provide rigidity to a substantial outer portion of the check-valve rubber flapper, yet not interfere with normal operation. The semi-circular C-plate may comprise a fork shape having a bottom end with a first terminal end and a second terminal end. The first terminal end and the second terminal end are located on a single plane.

The semi-circular C-plate (at an outer edge) comprises a larger diameter than an inside diameter of the inlet of the centrifugal pump. The semi-circular C-plate may be about ⅛ of an inch in thickness but may be 0.036 inch (in alternate embodiments) to prevent over-flexing of the check-valve rubber flapper. The flapper reinforcement plate provides stiffening to prevent tortional movement of the pump check-valve rubber flapper in relation to the inlet of the centrifugal pump during suction periods.

The flapper reinforcement plate may comprise stainless steel or brass thus designed to resist oxidation; other equivalent materials may be used that provide sufficient durability. The semi-circular C-plate is at least 3 inches in diameter but may be larger depending on the size of the pump. The flapper reinforcement plate is useful for fastening to a second contact face of a check valve rubber flapper of a centrifugal pump such that additional rigidity is provided to the rubber flapper thereby improving the ability to seal the pump water channel and increasing the service life of the pump check-valve rubber flapper.

The pump check-valve rubber flapper life extender system may be offered as a kit having a flapper reinforcement plate and a set of user instructions for installation and maintenance. A method of use for the flapper reinforcement plate may have the steps of placing a centrifugal pump in a user-preferred location, attaching a suction hose and a discharge hose to the centrifugal pump, priming the centrifugal pump, running the centrifugal pump, and stopping the centrifugal pump.

The present invention holds significant improvements and serves as a pump check-valve rubber flapper life extender system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pump check-valve rubber flapper life extender system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a check valve and more particularly to a pump check-valve rubber flapper life extender system as used to improve the reliability and life span of a rubber check valve.

Generally speaking, the flapper reinforcement plate is a metal C-shaped stiffening plate for attachment to rubber flapper style centrifugal pump check valves. The C-shaped plate assists in sealing by adding weight to the rubber flapper and preventing torsional flexing of the rubber flapper. The improved sealing lengthens the service life of the check valve.

Figure 1:
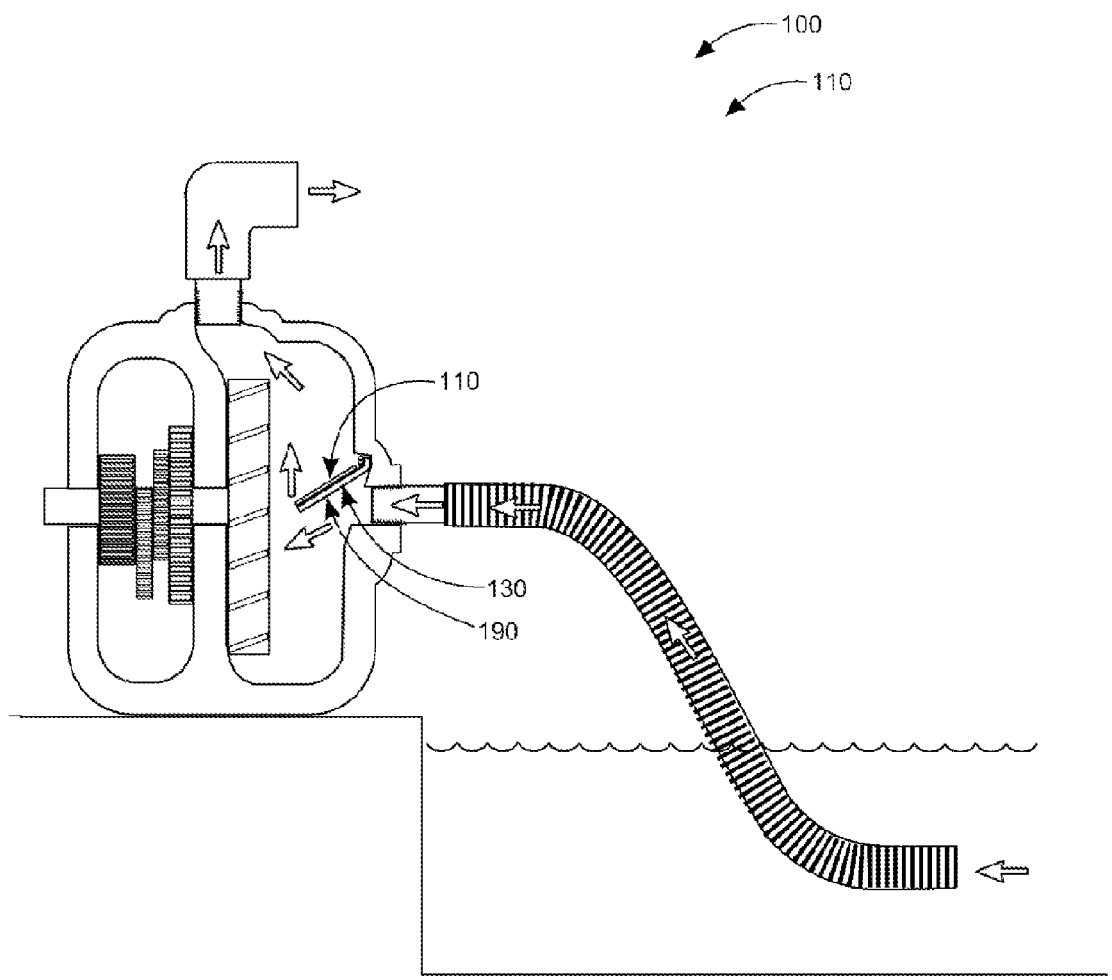
FIG. 1 shows an in-use condition illustrating a pump check-valve rubber flapper life extender system in an in use condition according to an embodiment of the present invention.

Referring to the drawings by numerals of reference there is shown in FIG. 1, illustrating pump check-valve rubber flapper life extender system 100 in an in-use condition according to an embodiment of the present invention.

Flapper reinforcement plate 110 is useful for fastening to second contact face 120 of check-valve 190 rubber flapper 130 of a centrifugal pump such that additional rigidity is provided to rubber flapper 130 thereby improving the ability to seal the pump water suction channel and increasing service life of flapper reinforcement plate 110. Semi-circular c-plate 140 comprises a larger diameter than an inside diameter of inlet of centrifugal pump.

Figure 2:
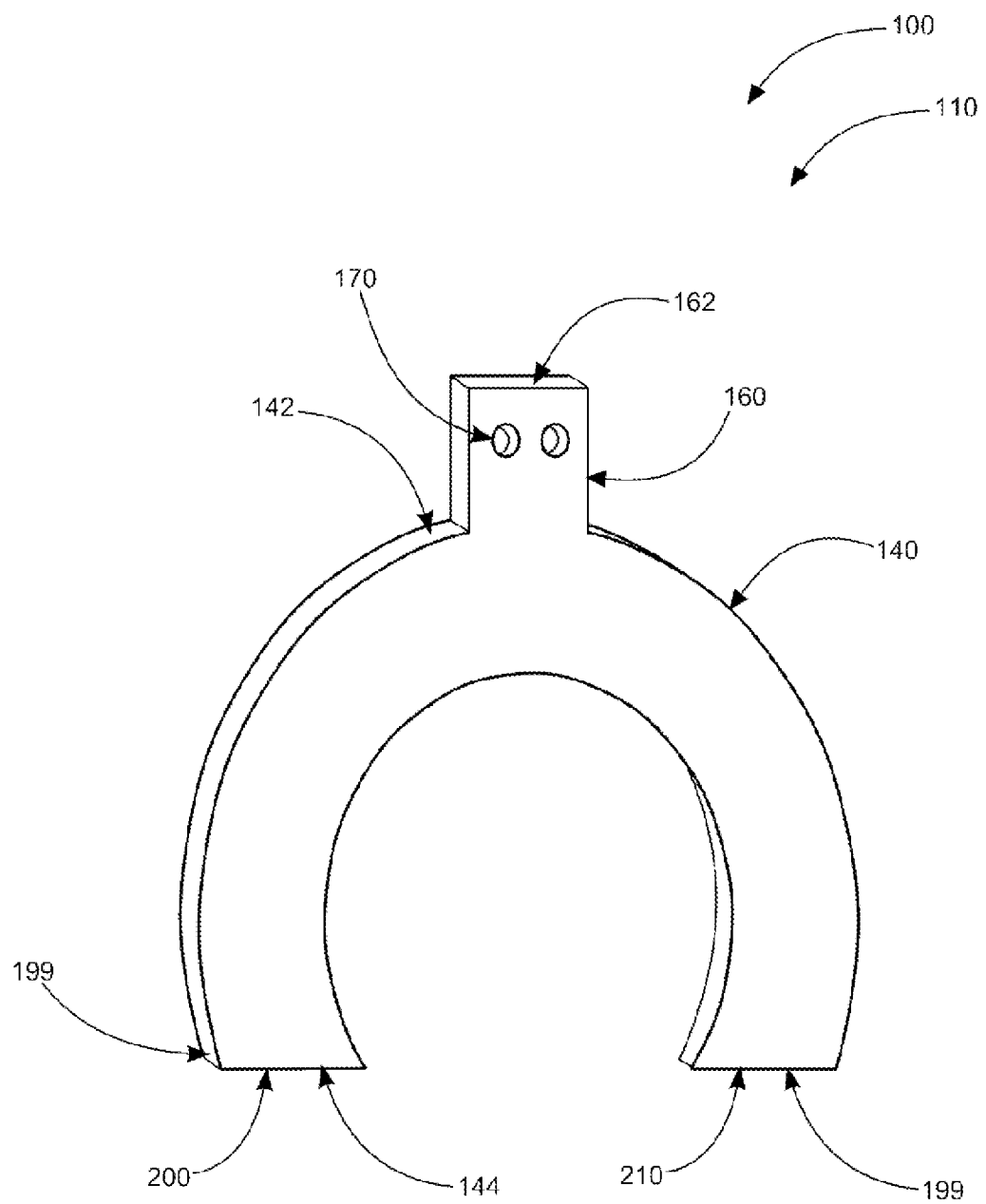
FIG. 2 is a perspective view illustrating a flapper reinforcement plate of the pump check-valve rubber flapper life extender system according to an embodiment of the present invention of FIG. 1.

Referring now to FIG. 2, a perspective view illustrating pump check-valve rubber flapper life extender system 100 according to an embodiment of the present invention of FIG. 1.

Flapper reinforcement plate 110 has mount tab 160 and may have at least one (two preferred) mounting through-hole 170; semi-circular C-plate 140 having top end 142, bottom end 144, first contact face 146, and outside face 180. Flapper reinforcement plate 110 comprises mount tab 160 attached to semi-circular C-plate 140. Mount tab 160 may comprise a rectangular shape and at least 2 mounting through-hole(s) 170 and is able to be fastened to check-valve 190 rubber flapper 130 via fasteners, thus minimizing side-to-side movement relative to the inlet of the centrifugal pump.

Figure 3:
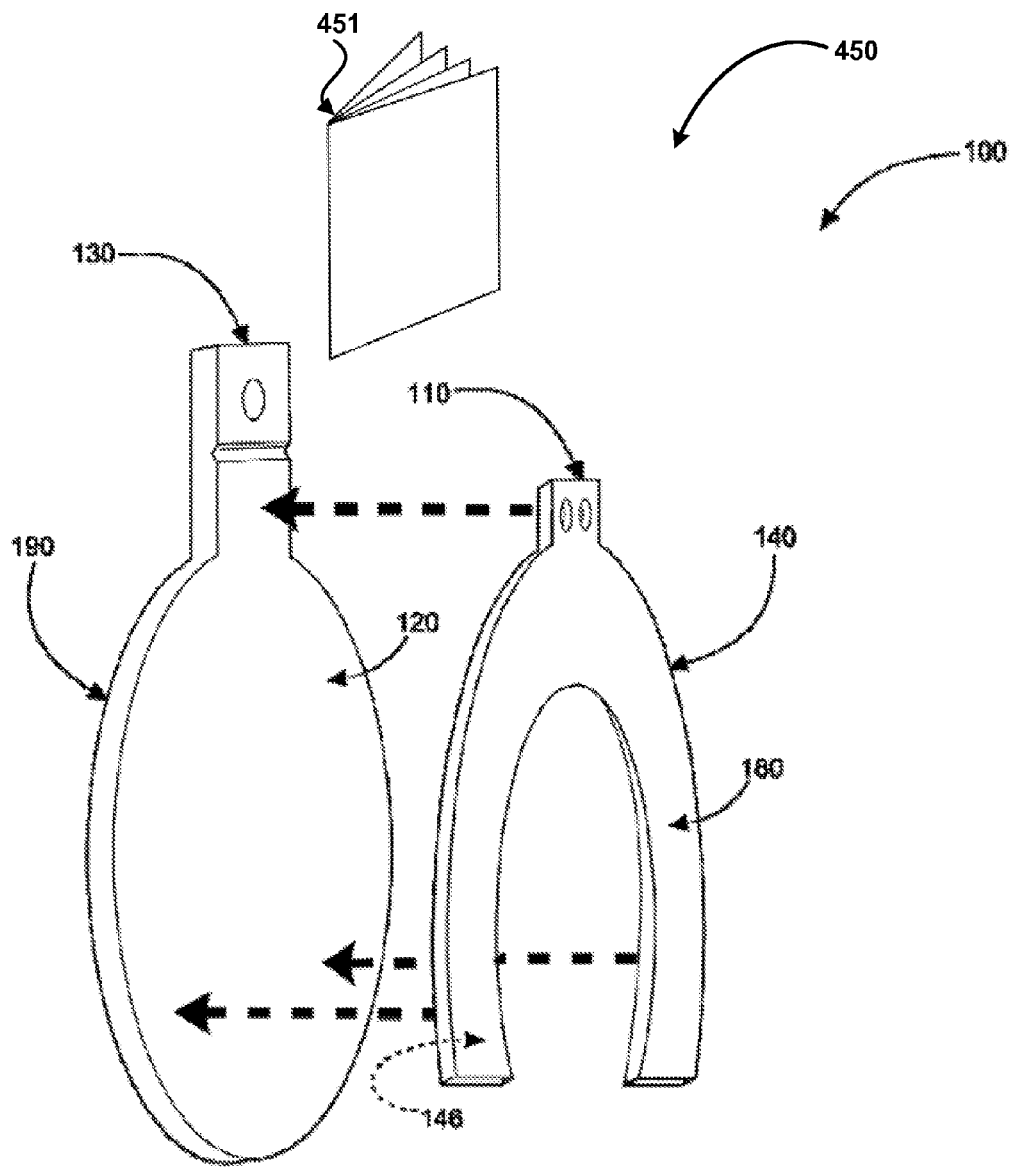
FIG. 3 is a front elevation view illustrating the pump check-valve rubber flapper life extender system according to an embodiment of the present invention of FIG. 1.

Referring now to FIG. 3, a front elevation view illustrating semi-circular c-plate 140 of pump check-valve rubber flapper life extender system 100 according to an embodiment of the present invention of FIG. 1.

Mounting through-hole(s) 170 are adjacent to top-edge 162 of mount tab 160 and are located linearly to each other. The parameters of semi-circular c-plate 140 are defined by top end 142, bottom end 144, first contact face 146, and outside face 180. Semi-circular c-plate 140 may comprise a fork shape having bottom end 144 with first terminal end 200 and second terminal end 210. First terminal end 200 and second terminal end 210 are located on a single plane. Mounting through-hole(s) 170 are located in mount tab 160. Bottom end 144 is located at opposing end 199 of flapper reinforcement plate 110 from mount tab 160. Flapper reinforcement plate 110 may comprise stainless steel or may comprise brass to resist oxidation. Other suitably equivalent materials may be used. Semi-circular c-plate 140 is at least 3 inches in diameter but may be larger depending on size of pump.

Figure 4:
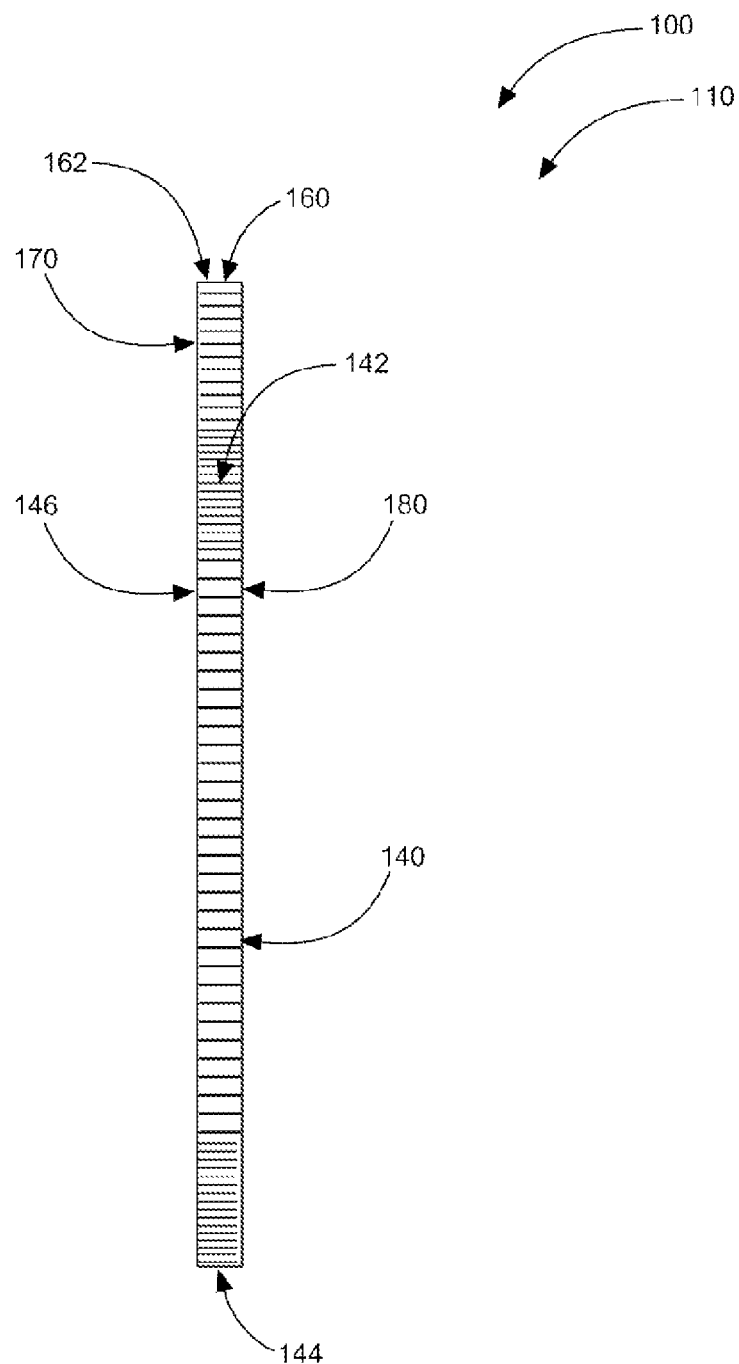
FIG. 4 is a side elevation view illustrating the flapper reinforcement plate of the pump check-valve rubber flapper life extender system according to an embodiment of the present invention of FIG. 1.

Referring now to FIG. 4, a side elevation view illustrating pump check-valve rubber flapper life extender system 100 according to an embodiment of the present invention of FIG. 1.

Mount tab 160 of flapper reinforcement plate 110 is coplanar and integral with top end 142 of semi-circular C-plate 140. First contact face 146 of semi-circular C-plate 140 is parallel planar with outside face 180 and first contact face 146 and outside face 180 are integral with semi-circular C-plate 140. The C-shape of semi-circular C-plate 140 is able to provide rigidity to a substantial outer portion of check-valve 190 rubber flapper 130. First terminal end 200 and second terminal end 210 are located on a single plane. Semi-circular C-plate 140 may be about 0.036 of an inch in thickness but may be ⅛ inch in thickness for different pump sizes or higher horsepower pumps to prevent over-flexing of check-valve 190 rubber flapper 130. Flapper reinforcement plate 110 provides stiffening to prevent tortional movement of pump check-valve 190 rubber flapper 130 in relation to inlet of a centrifugal pump during suction periods.

Pump check-valve rubber flapper life extender system 100 may be sold as kit 450 comprising the following parts: at least one flapper reinforcement plate 110 and at least one set of user instructions 451. The kit has instructions such that functional relationships are detailed in relation to the structure of the invention (such that the invention can be used, maintained, or the like in a preferred manner). Pump check-valve rubber flapper life extender system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, those for use with different shaped flappers, parts may be sold separately, etc., may be sufficient.

Figure 5:
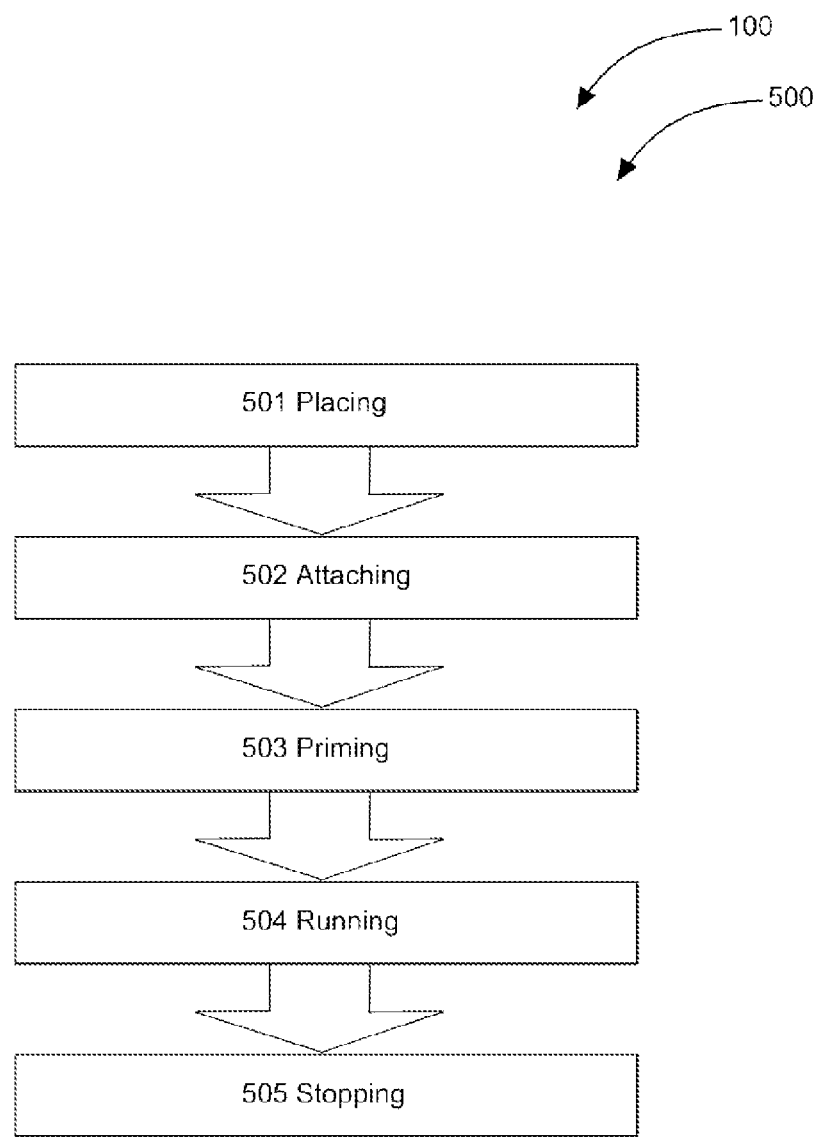
FIG. 5 is a flowchart illustrating a method of use for the pump check-valve rubber flapper life extender system according to an embodiment of the present invention of FIGS. 1-4.

Referring now to FIG. 5, showing method of use 500 for pump check-valve rubber flapper life extender system 100. A method of using (method of use 500) pump check-valve rubber flapper life extender system 100 may comprise the steps of step one 501 placing a centrifugal pump in a user-preferred location; step two 502 attaching a suction hose and a discharge hose to the centrifugal pump; step three 503 priming the centrifugal pump; step four 504 running the centrifugal pump; and step five 505 stopping the centrifugal pump.

It should be noted that steps 501-504 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pump check-valve rubber flapper life extender system comprising:
    a) a flapper reinforcement plate; a pump-check valve rubber flapper; and a centrifugal pump with a fluid inlet, the flapper reinforcement plate comprising:
        i) a mount tab having:
            (1) at least two mounting through-holes;
        ii) a semi-circular C-plate having:
            (1) a top end;
            (2) a bottom end;
            (3) a first contact face;
            (4) an outside face; and
            (5) two mirror-image stiffening-arms;
    b) wherein the pump check-valve rubber flapper has a first contact face that mates with a sealing face of said inlet of said centrifugal pump and a second-contact face that mates with said semi-circular C-plate;
    c) wherein said at least two mounting through-holes are positioned within said mount tab of said flapper reinforcement plate such that said at least two mounting through-holes are located between mounting means of said pump check-valve rubber flapper and said fluid inlet of said centrifugal pump whereby said flapper reinforcement plate is installed to said pump check-valve rubber flapper after said pump check-valve rubber flapper is installed in said centrifugal pump;
    d) wherein said mount tab and said semi-circular C-plate comprise a larger diameter than an inside diameter of said fluid inlet of said centrifugal pump;
    e) wherein said mount tab of said flapper reinforcement plate is structured and arranged coplanar and integral with said top end of said semi-circular C-plate;
    f) wherein said at least two mounting through-holes are located through said mount tab;
    g) wherein a transition between said mount tab and said semi-circular C-plate is rigid in two orthogonal directions about said at least two mounting through-holes within a plane of said semi-circular C-plate;
    h) wherein the transition between said mount tab and said semi-circular C-plate is structured and arranged, when considering the mount tab and semi-circular C-plate's intrinsic structural characteristics, to limit range of torsional flexure of said pump check-valve rubber flapper such that said pump check-valve rubber flapper is dimensionally-limited from seating off-center and preventing fluid back-feed across said sealing face of an fluid inlet of said centrifugal pump;
    i) wherein said bottom end is located at an opposing end from said mount tab;
    j) wherein said first contact face of said semi-circular C-plate is parallel planar with said outside face of said semi-circular C-plate, said first contact face and said outside face are integral with said semi-circular C-plate;
    k) wherein said flapper reinforcement plate is structured and arranged with a planar-face-surface configured to planarly-mate to circumferential surface-regions at a majority of a circumference on said second contact face of said pump check-valve rubber flapper; and;
    l) wherein said two mirror-image stiffening-arms protrude from said mount tab and have planar-surface contact with circumferential surface-regions at a majority of a circumference of said second-contact face of said pump check-valve rubber flapper that limits range of out-of-plane flexure of said pump check-valve rubber flapper such that said pump check-valve rubber flapper is dimensionally-limited from partially seating with said sealing face.

* * * * *